United States Patent Office 3,836,582
Patented Sept. 17, 1974

3,836,582
CARBAMALDOXIMES
Jacques Perronnet and Pierre Girault, Paris, France, assignors to Roussel-UCLAF, Paris, France
No Drawing. Filed Oct. 23, 1973, Ser. No. 408,744
Claims priority, application France, Nov. 6, 1972, 7239141
Int. Cl. C07c 131/00
U.S. Cl. 260—566 AC                          2 Claims

ABSTRACT OF THE DISCLOSURE

Novel carbamaldoximes of the formula

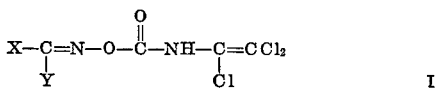

wherein Y is selected from the group consisting of hydrogen, chlorine and bromine and X is selected from the group consisting of phenyl optionally substituted with at least one member of the group consisting of halogen, cyano, —$NO_2$, alkyl of 1 to 6 carbon atoms and alkoxy of 1 to 6 carbon atoms and nitrofuryl having fungicidal activity.

STATE OF THE ART

U.S. Pat. No. 3,742,036 describes aldoximes of the formula

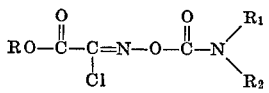

wherein R and $R_1$ are lower alkyl and $R_2$ is hydrogen or lower alkyl having biocidal, fungicidal or bactericidal properties but these are chemically distinct from the compounds of formula I.

OBJECTS OF THE INVENTION

It is an object of the invention to provide the novel carbamaldoximes of formula I and a process for their preparation.

It is another object of the invention to provide novel fungicidal compositions and to provide a novel method of combatting fungi.

These and other objects and advantages of the invention will become obvious from the following detailed description.

THE INVENTION

The novel carbamaldoximes of the invention have the formula

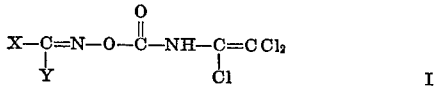

wherein Y is selected from the group consisting of hydrogen, chlorine and bromine and X is selected from the group consisting of phenyl optionally substituting with at least one member of the group consisting of halogen, cyano —$NO_2$, alkyl of 1 to 6 carbon atoms and alkoxy of 1 to 6 carbon atoms and nitrofuryl. The preferred compounds of formula I are O-[N-trichlorovinylcarbamoyl]-α-p-dichlorobenzaldoxime and O - [N-trichlorovinylcarbamoyl]-5-nitrofurfuraldoxime.

The process of the invention for the preparation of the products of formula I consists of reacting trichlorovinyl isocyanate with an aldoxime of the formula

wherein X and Y have the above definition. The reaction is preferably effected in the presence of an organic solvent such as toluene or tetrahydrofuran and a tertiary base such as triethylamine or pyridine.

The aldoximes of formula II can be prepared by known methods such as condensing hydroxylamine with the appropriate aldehyde.

The novel fungicidal compositions of the invention are comprised of an effective amount of at least one compound of formula I and a carrier. The compositions can also optionally contain one or more other pesticides or other products influencing the growth of plants.

The compositions may be in the form of powders, granules, suspensions, emulsions or solutions, containing besides the active ingredients, cationic, non-ionic or anionic surface active agents; inert powders such as talc, clays, silicates, Kieselguhr, etc.; or a vehicle such as water, alcohol, hydrocarbons or other organic solvents, mineral, vegetable or animal oils, etc.

The fungicidal powders used for foliar spraying preferably contain 25 to 95% by weight of the compounds of formula I and the fungicidal compositions used as foliar powders preferably contain 2.5 to 99% by weight of the compounds of formula I.

An example of a composition for a foliar spray comprises 25% by weight of O-[N-trichlorovinylcarbamoyl]-α,p-dichlorobenzaldoxime, 15% by weight of Ekapersol S (condensation product of sodium naphthalene sulfonate), 0.5% by weight of Brecolane NVA (sodium alkyl naphthalene sulfonate), 34.5% by weight of Zeosil 39 (precipitated synthetic hydrated silica) and 25% by weight of Vercoryl S (colloidal Kaolin).

For the protection of paints against fungi, the active compound of formula I may be incorporated during grinding of the pigments. The concentration of the products of formula I is preferably 0.05 to 5% by weight of the paint. For example, 1% by weight of O-[N-trichlorovinylcarbamoyl] - α-p-dichlorobenzaldoxime is added to the pigments during grinding to obtain a paint protected against fungi.

The novel method of the invention for killing fungi comprises contacting fungi with a fungicidal amount of at least one compound of formula I. The method is useful in agriculture and in protecting paints.

In the following examples there are described several preferred embodiments to illustrate the invention. However, it should be understood that the invention is not intended to be limited to the specific embodiments.

EXAMPLE I

O-[N-trichlorovinylcarbamoyl]-α,p-dichlorobenzaldoxime 19 g. of α,p-dichlorobenzaldoxime [Farley, Proc. N. Dakota Acad. Sci., Col. 13 (1959), p. 61] and 20 g. of trichlorovinyl isocyanate, Pat. No. 3,468,923) were added to 80 ml. of toluene and the mixture was stirred for 30 minutes at 90° C. The toluene was removed by distillation under reduced pressure and the residue was added to petroleum ether (boiling point 65–75° C.) containing 10% isopropyl ether. The crystals formed were recovered by vacuum filtration and dried to obtain 27.2 g. of O - [N - trichlorovinylcarbamoyl] - α,p-dichlorobenzaldoxime melting at 92° C.

*Analysis*: $C_{10}H_5Cl_5N_2O_2$.—Calculated (percent): C, 33.14; H, 1.39; Cl, 48.92; N, 7.73. Found (percent): C, 33.3; H, 1.8; Cl, 48.5, N, 7.5.

EXAMPLE II

O-[N-trichlorovinylcarbamoly]-5-nitro-furfuraldoxime 25 g. of 5-nitro-furfuraldoxime [Rev. Chim. Acad. Rep. populaire de Roumainie, I No. 1 (1956), pp. 155–164] were added to 250 ml. of tetrahydrofuran and after cooling to 5° C., 1 ml. of triethylamine was added thereto. Slowly, 36 g. of raw trichlorovinyl isocyanate (78% purity) were added and the mixture was stirred for 6 hours. The precipitate formed was recovered by vacuum filtration and was washed with petroleum ether (boiling point 65–75° C.), methanol and isopropyl ether and dried to obtain 23.7 g. of O-[N-trichlorovinyl-carbamoyl]-5-nitrofurfuraldoxime melting at 158° C.

*Analysis*: $C_8H_4Cl_3N_3O_5$.—Calculated (percent): C, 29.25; H, 1.22; N, 12.79; Cl, 32.38. Found (percent): C, 29.3; H, 1.1; N, 12.5, Cl, 32.3.

EXAMPLE III

The protective activity of O-[N-trichlorovinylcarbamoyl]α,p-dichlorobenzaldoxime for paints against fungi comprised incorporating 10 ml. of an acetone solution of the test compound into 100 g. of paint (oil or water base paint) to obtain a concentration of 2, 1, 0.5 or 0.25% by weight of the active compound. Layers of paint were prepared by spreading the paint thus treated on polyethylene sheets while the control layers were untreated. After drying at 24 to 48 hours, the paint layers were removed from the polyethylene and were cut into 5 x 2 cm. pieces. The said test pieces of paint were placed in dishes containing a gelose nutritive medium free from assimilable carbon and comprised of 3 g. of ammonium nitrate, 0.5 g. of magnesium sulfate, 0.25 g. of potassium chloride, 1 g. of monopotassium phosphate, 15 g. of agaragar and 1000 g. of demineralised water. Before addition of agar-agar, the pH was adjusted to 6–7. Each dish contained 2 test pieces and 4 tests were run for each concentration.

The test pieces were contaminated by placing on each test piece drops of a fungi spore suspension of *Penicillium luteum, Myrothecium verrucaria, Cladosporium herbarum, Stachybotrys atra, Paecylomyces varioti, Pullularia pullulans, Irichoderma lignorum, Chaetomium globosum* and *Aspergillus niger*. The samples were stored in a tropical room at 35° C. and 95% relative humidity for three months. The attack before washing and after washing (developments above all samples, developments by placement of drops; stains at the placement of the drops, no attack) was noted. The washing was for the purpose of eliminating the stains caused by superficial development of mould, which do not correspond to an effective attack of the paint. The results of the following Tables show that the test compound has a good activity for protecting paints against the various moulds tested.

*Stachybotrys atra*

| | Water base paint | | | | | | | | Oil-base paint | | | | | | | |
|---|---|---|---|---|---|---|---|---|---|---|---|---|---|---|---|---|
| | Before washing | | | | After washing | | | | Before washing | | | | After washing | | | |
| Concentration, percent MA | 2 | 1 | 0.5 | 0.25 | 2 | 1 | 0.5 | 0.25 | 2 | 1 | 0.5 | 0.25 | 2 | 1 | 0.5 | 0.25 |
| Development over all the test piece | | | | | | | | | | | | | | | | |
| Development at the placement of the drops | | | | | | | | | | | | | | | | |
| Stains at the placement of the drops | | | | | | | | | + | + | + | + | + | + | + | + |
| Total protection | | | | | | | | | | | | | | | | |

*Paecylomyces varioti*

| | Water base paint | | | | | | | | Oil-base paint | | | | | | | |
|---|---|---|---|---|---|---|---|---|---|---|---|---|---|---|---|---|
| | Before washing | | | | After washing | | | | Before washing | | | | After washing | | | |
| Concentration, percent MA | 2 | 1 | 0.5 | 0.25 | 2 | 1 | 0.5 | 0.25 | 2 | 1 | 0.5 | 0.25 | 2 | 1 | 0.5 | 0.25 |
| Development over all the test piece | | | | | | | | | | | | | | | | |
| Development at the placement of the drops | | | | | | | | | | | + | | | | | |
| Stains at the placement of the drops | | | + | + | | | + | + | + | + | + | | | | | + |
| Total protection | | | | | | | | | | | | | | + | + | + |

*Pullularia pullulans*

| | Water base paint | | | | | | | | Oil-base paint | | | | | | | |
|---|---|---|---|---|---|---|---|---|---|---|---|---|---|---|---|---|
| | Before washing | | | | After washing | | | | Before washing | | | | After washing | | | |
| Concentration, percent MA | 2 | 1 | 0.5 | 0.25 | 2 | 1 | 0.5 | 0.25 | 2 | 1 | 0.5 | 0.25 | 2 | 1 | 0.5 | 0.25 |
| Development over all the test piece | | | | | | | | | | | | | | | | |
| Development at the placement of the drops | | | + | + | | | | | + | + | + | + | | | | |
| Stains at the placement of the drops | | | + | | | + | + | + | | | | | + | + | + | + |
| Total protection | + | | | | + | | | | | | | | | | | |

*Trichoderma lignorium*

| | Water base paint | | | | | | | | Oil-base paint | | | | | | | |
|---|---|---|---|---|---|---|---|---|---|---|---|---|---|---|---|---|
| | Before washing | | | | After washing | | | | Before washing | | | | After washing | | | |
| Concentration, percent MA | 2 | 1 | 0.5 | 0.25 | 2 | 1 | 0.5 | 0.25 | 2 | 1 | 0.5 | 0.25 | 2 | 1 | 0.5 | 0.25 |
| Development over all the test piece | | | | | | | | | | | | + | | | | |
| Development at the placement of the drops | | + | + | + | | | | | | | + | | | | | |
| Stains at the placement of the drops | | | | | | + | + | + | + | + | | | | | + | + |
| Total protection | + | | | | + | + | + | | | | | | + | | | + |

*Chaetomium globosum*

| | Water base paint | | | | | | | | Oil-base paint | | | | | | | |
|---|---|---|---|---|---|---|---|---|---|---|---|---|---|---|---|---|
| | Before washing | | | | After washing | | | | Before washing | | | | After washing | | | |
| Concentration, percent MA | 2 | 1 | 0.5 | 0.25 | 2 | 1 | 0.5 | 0.25 | 2 | 1 | 0.5 | 0.25 | 2 | 1 | 0.5 | 0.25 |
| Development over all the test piece | | | | | | | | | | | | + | | | | |
| Development at the placement of the drops | | | | | | | | | + | + | + | | | | | |
| Stains at the placement of the drops | | + | + | + | | | | | | | | | + | + | + | + |
| Total protection | + | | | | + | + | + | + | | | | | | | | |

Aspergillus niger

| | Water base paint | | | | | | | | Oil-base paint | | | | | | | |
|---|---|---|---|---|---|---|---|---|---|---|---|---|---|---|---|---|
| | Before washing | | | | After washing | | | | Before washing | | | | After washing | | | |
| Concentration, percent MA | 2 | 1 | 0.5 | 0.25 | 2 | 1 | 0.5 | 0.25 | 2 | 1 | 0.5 | 0.25 | 2 | 1 | 0.5 | 0.25 |
| Development over all the test piece | | | | | | | | | | | | | | | | |
| Development at the placement of the drops | | | | | | | | | | + | + | | | | | |
| Stains at the placement of the drops | | | | | | | | | | | + | | | + | + | + |
| Total protection | + | + | + | + | + | + | + | + | | | | + | | | | |

Penicillium luteum

| | Water base paint | | | | | | | | Oil-base paint | | | | | | | |
|---|---|---|---|---|---|---|---|---|---|---|---|---|---|---|---|---|
| | Before washing | | | | After washing | | | | Before washing | | | | After washing | | | |
| Concentration, percent MA | 2 | 1 | 0.5 | 0.25 | 2 | 1 | 0.5 | 0.25 | 2 | 1 | 0.5 | 0.25 | 2 | 1 | 0.5 | 0.25 |
| Development over all the test piece | | | | | | | | | | | | | | | | |
| Development at the placement of the drops | | | | | | | | | | | | | | | | |
| Stains at the placement of the drops | | + | + | + | | + | + | + | | + | + | + | | + | + | |
| Total protection | + | | | | + | + | | | + | | | | + | | | |

Myrothecium verrucaria

| | Water base paint | | | | | | | | Oil-base paint | | | | | | | |
|---|---|---|---|---|---|---|---|---|---|---|---|---|---|---|---|---|
| | Before washing | | | | After washing | | | | Before washing | | | | After washing | | | |
| Concentration, percent MA | 2 | 1 | 0.5 | 0.25 | 2 | 1 | 0.5 | 0.25 | 2 | 1 | 0.5 | 0.25 | 2 | 1 | 0.5 | 0.25 |
| Development over all the test piece | | | | | | | | | | | | | | | | |
| Development at the placement of the drops | | + | + | | | | | | | | | | | | | |
| Stains at the placement of the drops | + | + | | | + | + | + | + | + | + | + | + | | | | |
| Total protection | | | | | | | | | | | | | + | + | + | + |

Cladosporium herbarum

| | Water base paint | | | | | | | | Oil-base paint | | | | | | | |
|---|---|---|---|---|---|---|---|---|---|---|---|---|---|---|---|---|
| | Before washing | | | | After washing | | | | Before washing | | | | After washing | | | |
| Concentration, percent MA | 2 | 1 | 0.5 | 0.25 | 2 | 1 | 0.5 | 0.25 | 2 | 1 | 0.5 | 0.25 | 2 | 1 | 0.5 | 0.25 |
| Development over all the test piece | | | | | | | | | | | | | | | | |
| Development at the placement of the drops | | | | | | | | | | + | + | | | | | |
| Stains at the placement of the drops | | | + | + | | + | + | + | + | + | | | | | | |
| Total protection | + | + | | | + | + | | | | | | | + | + | + | + |

Various modifications of the products and methods of the invention may be made without departing from the spirit or scope thereof and it should be understood that the invention is to be limited only as defined in the appended claims.

We claim:
1. A compound of the formula

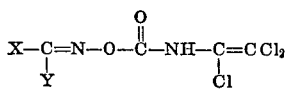

wherein Y is selected from the group consisting of hydrogen, chlorine and bromine and X is selected from the group consisting of phenyl optionally substituted with at least one member of the group consisting of halogen, cyano, $-NO_2$, alkyl of 1 to 6 carbon atoms and alkoxy of 1 to 6 carbon atoms.

2. A compound of claim 1 which is O-[N-trichlorovinylcarbamoyl]-α,p-dichlorobenzaldoxime.

References Cited

UNITED STATES PATENTS

| | | | |
|---|---|---|---|
| 3,223,733 | 12/1965 | Heiss et al. | 260—566 AC |
| 3,553,264 | 1/1971 | Addor | 260—566 AC |

BERNARD HELFIN, Primary Examiner

G. A. SCHWARTZ, Assistant Examiner

U.S. Cl. X.R.

260—347.7, 465 E; 424—304, 327